US010592608B2

(12) United States Patent
Benantar et al.

(10) Patent No.: US 10,592,608 B2
(45) Date of Patent: Mar. 17, 2020

(54) TOPIC BASED CONVERSATION RETRIEVAL

(71) Applicant: International Business Machines Corporation, Armonk, NY (US)

(72) Inventors: Messaoud Benantar, Austin, TX (US); David Y. Chang, Travis, TX (US); Vishwanath Venkataramappa, Austin, TX (US); Liam S. Harpur, Skerries (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/864,072

(22) Filed: Jan. 8, 2018

(65) Prior Publication Data
US 2019/0213255 A1 Jul. 11, 2019

(51) Int. Cl.
G06F 17/27 (2006.01)
G06F 16/35 (2019.01)
G06F 16/907 (2019.01)
G06F 3/16 (2006.01)

(52) U.S. Cl.
CPC .......... *G06F 17/2785* (2013.01); *G06F 16/35* (2019.01); *G06F 16/907* (2019.01); *G06F 3/16* (2013.01)

(58) Field of Classification Search
CPC .... G06F 17/2785; G06F 16/907; G06F 16/35; G06F 3/16; G10L 15/26; G10L 15/265; G10L 15/1815; G10L 21/0272; G10L 25/51; H04M 3/42221; H04M 1/656
See application file for complete search history.

(56) References Cited

U.S. PATENT DOCUMENTS

| 7,069,300 | B2 | 6/2006 | Toyota et al. | |
|---|---|---|---|---|
| 7,298,930 | B1* | 11/2007 | Erol | G06K 9/00711 382/305 |
| 7,571,212 | B2 | 8/2009 | Reynolds et al. | |
| 8,457,472 | B2 | 6/2013 | Hyun et al. | |
| 8,621,022 | B2 | 12/2013 | Buchheit et al. | |
| 9,697,198 | B2 | 7/2017 | Jones et al. | |
| 2007/0011008 | A1* | 1/2007 | Scarano | H04M 3/2281 704/254 |
| 2011/0044447 | A1* | 2/2011 | Morris | G06T 11/206 379/265.03 |
| 2011/0145334 | A9 | 6/2011 | Colson et al. | |
| 2015/0195406 | A1* | 7/2015 | Dwyer | H04M 3/5175 379/265.07 |
| 2016/0088154 | A1* | 3/2016 | Conway | H04M 3/42221 379/265.07 |

(Continued)

*Primary Examiner* — Andrew C Flanders
(74) *Attorney, Agent, or Firm* — Schmeiser, Olsen & Watts, LLP; Michael O'Keefe

(57) ABSTRACT

A topic based conversation retrieval system and method may include receiving a first conversation between a first plurality of users a second conversation between the first plurality of users or a second plurality of users, the second conversation being conducted on a second communication mode different than the first communication mode, analyzing the first conversation and the second conversation, determining one or more topics of discussion in the first conversation and the second conversation, and retrieving a portion of each of the first conversation and the second conversation, where the portion is related to a topic chosen to be retrieved.

17 Claims, 8 Drawing Sheets

(56) References Cited

U.S. PATENT DOCUMENTS

| | | |
|---|---|---|
| 2016/0241494 A1 | 8/2016 | Badge et al. |
| 2016/0353310 A1* | 12/2016 | Gorny .................. G06F 3/0481 |
| 2017/0026254 A1* | 1/2017 | Adylov .................. H04L 43/04 |
| 2017/0228445 A1 | 8/2017 | Chiu et al. |
| 2018/0046433 A1* | 2/2018 | Spiessbach ....... H04M 3/42221 |
| 2018/0077286 A1* | 3/2018 | Raanani ............. G10L 15/1815 |
| 2018/0096271 A1* | 4/2018 | Raanani ............. G06Q 10/0635 |
| 2018/0336902 A1* | 11/2018 | Cartwright .......... G06F 17/2785 |

\* cited by examiner

TOPIC BASED CONVERSATION RETRIEVAL

TECHNICAL FIELD

The present invention relates to systems and methods for improving collaboration. More specifically, the invention relates to systems and methods for recording and retrieving collaborative conversations taking place over time, across different channels, and between different users.

BACKGROUND

Users in the work place today are accustomed to using a multitude of different methods of communication, or communication modes, during collaboration. Current recording methods for communication modes such as email, chat messaging services, channel services, wireless text messaging, voice, or the like, are not sufficient with meeting current collaboration demands. Frequently in the work place users interact using a multitude of these communication modes on the same collaboration. Often times the need arises for users to compile all of the specific discussions and conversations that were conducted about a particular topic, event, time-frame, or a combination thereof, across all communication modes. In this case, users are forced to manually review individual histories found in each separate communication mode used. This process is often time-consuming and can be frustrating given the various communication modes commonly used and the scale of communications that occur on a daily basis. When users are collaborating on a number of topics it becomes increasingly difficult to re-assemble past communication based on a single relevant topic.

At present, there is no adequate way for a plurality of users to record and retrieve specific communications on collaborations conducted over a plurality of communication modes that follows a developing topic.

SUMMARY

An embodiment of the present invention relates to a method, and associated computer system and computer program product, for topic based conversation retrieval. A processor of a computing system receives a first conversation between a first plurality of users, the first conversation being conducted on a first communication mode. A processor of a computing system receives a second conversation between the first plurality of users or a second plurality of users, the second conversation being conducted on a second communication mode different than the first communication mode. The first conversation and the second conversation are analyzed by the one or more processors. One or more topics of discussion in the first conversation and the second conversation are determined by the one or more processors. A portion of each of the first conversation and the second conversation is retrieved by the one or more processors, the portion being related to a topic chosen to be retrieved.

DETAILED DESCRIPTION

Users in the workplace today often communicate with other users while working on collaborative projects using various communication modes such as email services, wireless texting services, online chat messaging services, social media services, and voice services. Various modes of communication may be used between the same or similar groups of users working on the same project, working to solve the same problem, or the like. It is often the case that a user, or a group, needs to go back and review conversations that have occurred related to a given topic, problem, work item, or the like. Users may need to establish a trail, compile the information discussed, recall conversations related to a given topic, recall conversations related to a particular event, recall conversations related to a particular time-frame, or recall conversations discussed by a particular group of people. This requires users to manually review, look up, and sift through individual conversations conducted across multiple communication modes. This process is often time consuming and can be frustrating given the various communication modes users use and the scale of communications and conversations that pile up rapidly over time. To correlate and manually re-assemble communications based on topics, people, events, time-frames and the like takes significant time and effort and, being a manual process, may not be fully inclusive and may be prone to manual error.

Thus, there is a need for a multimodal topic based conversation retrieval system that is capable of retrieving conversations between a plurality of users related to a topic across a plurality of different communication modes. The present invention, when practiced, will result in an improvement in online communication technology by bringing together message threads having one or more common elements but otherwise occurring on disparate platforms into a single location. Further, the present invention will result in an improvement in computer technology by reducing computer resource usage because separate topic searches of different platforms or modes will not be required. The present invention allows for a single search to be conducted that crosses various communication platforms or modes.

Figure 1:
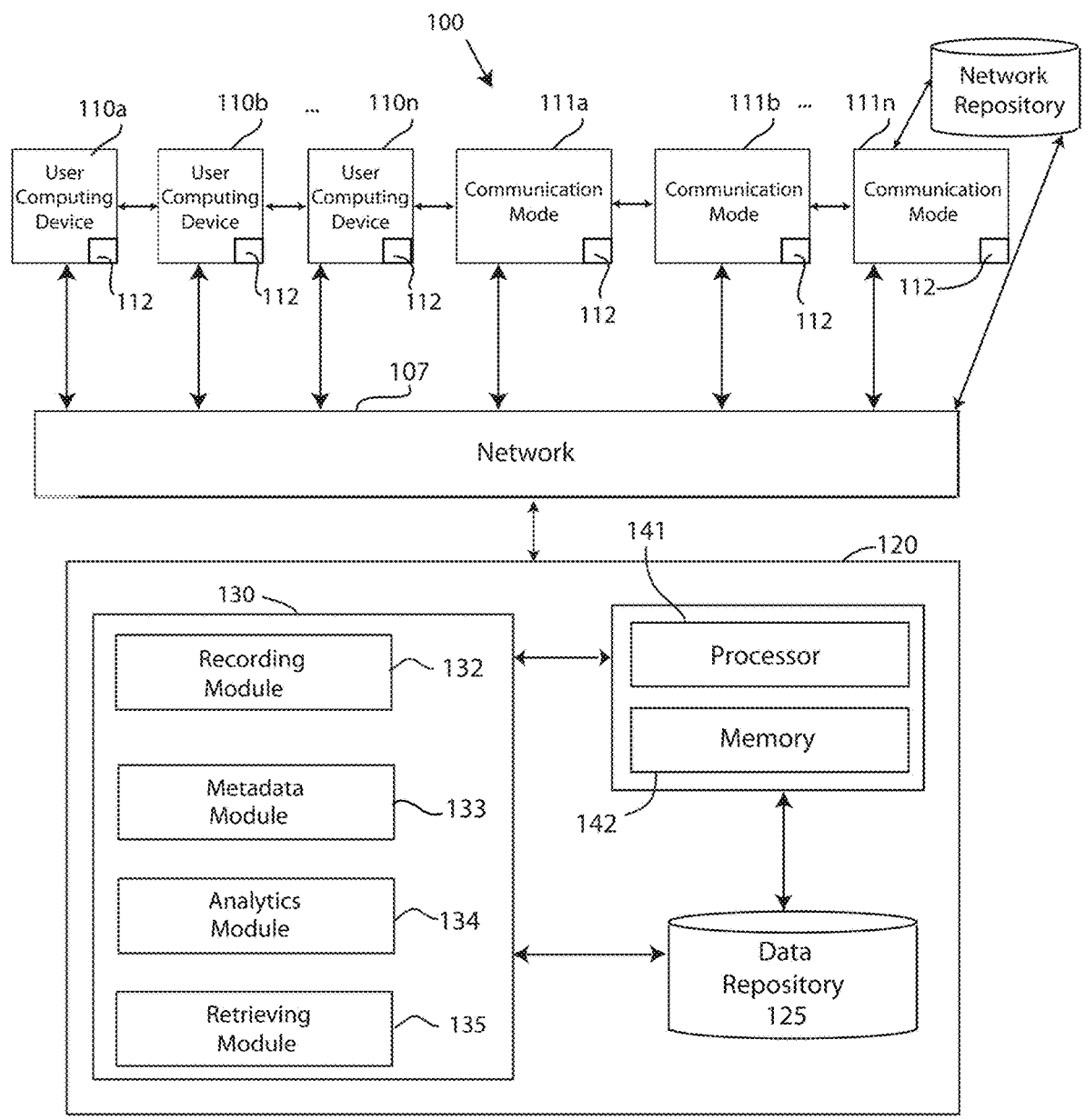
FIG. 1 depicts a block diagram of a topic based conversation retrieval system, in accordance with embodiments of the present invention.

FIG. 1 depicts a block diagram of a topic based conversation retrieval system 100, in accordance with embodiments of the present invention. Embodiments of the topic based conversation retrieval system 100 may be a system for retrieving conversations, or portions thereof, conducted between one or more users or user groups. The topic based conversation retrieval system 100 may be useful for users seeking to compile or review conversations conducted across multiple communication modes such as email services, wireless texting services, online chat messaging services, social media services, and voice services. The topic based conversation retrieval system 100 may avoid the need to manually search and compile conversations conducted across multiple communication modes. The topic based conversation retrieval system 100 may be able to track topics of conversation across the various communication modes, and may be able to return portions of conversations related to a given topic, between given users, conducted at a given time, or based on various other parameters described herein.

For example, saving an instant messaging chat history is done in the prior art as follows: one user decides to save a chat history to a particular communication mode such as Google Chat®. The present disclosure details a novel solution in order to enable users in the workplace to easily save and quickly track multi-modal conversations (email, online chat, online channels, etc). This may be accomplished by tracking the conversation and its movement Embodiments of the topic based conversation retrieval system 100 may be a context-based conversation retrieval system, a social network conversation retrieval system, a topic determination system, a topic recording system, a multimodal conversation storing system, a conversation based meta-data generating and indexing system, and the like. Embodiments of the topic based conversation retrieval system 100 may include a computing system 120. Embodiments of the computing system 120 may be a computer system, a computer, a server, one or more servers, a cloud computing device, a hardware device, a remote server, and the like.

Furthermore, embodiments of topic based conversation retrieval system 100 may include one or more user computing devices 110a, 110b . . . 110n and one or more communication modes 111a, 111b . . . 111n, communicatively coupled to a computing system 120 of the topic based conversation retrieval system 100 over a network 107. For instance, information/data may be transmitted to and received from the one or more user computing devices 110a, 110b . . . 110n and the one or more communication modes 111a, 111b . . . 111n over a network 107. A network 107 may be the cloud. Further embodiments of network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible repositories 114, knowledge bases or the like containing information related to the user, such as the user's SMPT mail server credentials, text chat server credentials, or other channel server credentials, social media credentials. The network repositories 114 may further include information related to the one or more communication modes 111a, 111b . . . 111n, such as information allowing the one or more communication modes 111a, 111b . . . 111n to run on the one or more user computing devices 110a, 110b . . . 110n. The network repositories 114 may further include information related to other systems connected to the network 107 that may be considered nodes of the network 107. In some embodiments, where the computing system 120 or network repositories allocate resources to be used by the other nodes of the network 107, the computing system 120 and network repository 114 may be referred to as servers.

The network repository 114 may be a data collection area on the network 107 which may back up and save all the data transmitted back and forth between the nodes of the network 107. For example, the network repository may be a data center saving and cataloging user conversations, user social media activity data, user searching history data, and the like. In some embodiments, a data collection center housing the network repository 114 may include an analytic module capable of analyzing each piece of data being stored by the network repository 114. Further, the computing system 120 may be integrated with or as a part of the data collection center housing the network repository 114. In some alternative embodiments, the network repository 114 may be a local repository that is connected to the computing system 120.

Embodiments of the one or more user computing devices 110a, 110b . . . 111n of the topic based conversation retrieval system 100 may be a user device, a cell phone, a smartphone, a user mobile device, a mobile computer, a tablet computer, a PDA, a smartwatch, a dedicated mobile device, a desktop computer, a laptop computer, or other internet accessible device or hardware. Embodiments of the one or more communication modes 111a, 111b . . . 111n of the topic based conversation retrieval system 100 may be one or more databases, storage devices, repositories, servers, computers, engines, and the like, that may service, run, store or otherwise contain information and/or data regarding a communication mode such as email services, wireless texting services, online chat messaging services, social media services, and voice services. The one or more communication modes 111a, 111b, . . . 111n may be accessed or may share a communication link over network 107, and may be managed and/or controlled by a third party, such as a communications or social media company. In an exemplary embodiment, the communication modes 111a, 111b . . . 111n may be a communication channel such as Slack®, IBM Sametime®, Facebook® Messenger, Google® Chat, Microsoft Outlook®, or the like.

Further, embodiments of the computing system 120 may be equipped with a memory device 142 which may store various data/information/code, and a processor 141 for implementing the tasks associated with the topic based conversation retrieval system 100. In some embodiments, an topic based conversation recording and/or retrieval application 130 may be loaded in the memory 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the topic based conversation recording and/or retrieval application 130. Embodiments of the topic based conversation recording and/or retrieval application 130 may be an interface, an application, a program, a module, or a combination of modules. In an exemplary embodiment, the topic based conversation recording and/or retrieval application 130 may be a software application running on one or more back end servers, servicing multiple computing devices.

The topic based conversation recording and/or retrieval system application 130 of the computing system 120 may include a recording module 132, a generating module 133, and indexing module 134, an analytics module 134, and a retrieving module 135. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the recording module 132 may include one or more components of hardware and/or software program code for receiving and/or recording conversations between the one or more users and/or the one or more user computing devices 110a, 110b . . . 110n. The receiving module 131 may be configured, for example, to receive conversations between the one or more users and/or the one or more user computing devices 110a, 110b . . . 110n when the conversations are being conducted over a plurality of communication modes. Embodiments of the recording module 132 may include one or more components of hardware and/or software program code for recording, saving or otherwise storing conversations, or portions of conversations, between the plurality of users and/or user computing devices 110a, 110b . . . 110n.

The recording module 132 may be located on a server located with a server or location containing the other modules 132, 133, 134, 135, 136. In alternative embodiments, the recording module 132 may include one or more recording agents 112 located on one or more of the one or more user computing devices 110a, 110b . . . 110n and/or located on one or more of the one or more communication modules 111a, 111b . . . 111n. The recording agents 112 may be a downloadable program operates on each of the one or more user computing devices 110a, 110b . . . 110n. The recording agents 112 may be a feature of each of the communication platforms 111a, 111b . . . 111n. The recording agents 112 may be an application that is downloaded by and operating on the user computing devices 110a, 110b . . . 110n. In other embodiments, the recording agent 112 may be a specialized hardware component of the system 100. In the case that the recording agent 112 is a specialized hardware device, the recording agent 112 may be placed proximate a user computing device and may be connected to the user computing device either by a wire or wirelessly. Whatever the embodiment, the recording module 132 and/or recording agent may be configured to record conversations between the users of the topic based conversation retrieval system 100 or the one or more user computing devices 110a, 110b . . . 110n.

The recording module 132 and/or recording agents 112 may be turned on by a user, or more than one users, when the user desires for a conversation to be recorded. For example, if the recording agent 112 is running on one of the user computing devices 110a, 110b . . . 110n, the user may turn the recording agent 112 on. The user may also input specific parameters of the conversation to be recorded. Parameters could be conversations pertaining to a chosen topic, conversations between particular users, and/or conversations taking place over a given time period, and the like. The recording agent 112 may be configured to record conversations pursuant to the requested parameters.

The recording module 132 and/or recording agents 112 of the topic based conversation retrieval system 100 may further be configured to remain recording the conversation(s) pertaining to the requested parameters even after the user that made the request has left the conversation(s), is busy and not participating in the conversation, or is unavailable. Further, the recording module 132 and/or recording agents 112 may be configured to remain actively recording a conversation even when some or all of the users involved in the conversation change. Thus, even if one or more users wish to leave one or more conversation(s) being recorded, the recording module 132 and/or recording agents 112 may be configured to remain recording the conversation(s). The settings of when the recording module 132 and/or recording agents 112 may be configured to record conversations may be set by individual users, by a manager of the individual users from a manager computing device (not shown) or by a system administrator.

The instructions provided to the recording module 132 and/or recording agents 112 may be used across conversations occurring using a plurality of the communication modes 111a, 111b . . . 111n. For example, if the recording module 132 and/or recording agents 112 are recording a conversation occurring between users over a first communication mode 111a, but then one or more of the users begin conversing over a second communication mode 111b, the recording module 132 and/or recording agents 112 may begin recording the conversation over the second communication mode 111b, particularly when the conversation over the second communication mode 111b conforms to parameters requested to be recorded.

Embodiments of the metadata module 133 may include one or more components of hardware and/or software program code for generating, saving, collecting, creating, storing or otherwise procuring metadata related to the received and/or recorded conversations. The metadata module 133 may generate, save, store, collect, create, store, or otherwise procure metadata related to, for example, user identifiers related to users conducting a conversation. User identifiers may be an actual name, a screen name, an IP address, an email address, or the like. User identifiers may relate to the one or more users and/or the one or more user computing devices 110a, 110b . . . 110n.

The metadata module 133 may generate, save, store, collect, create, or otherwise procure metadata related to a topic of the conversation being recorded and/or received by the topic based conversation retrieval system 100. The metadata module 133 may interact with the analytics module 134 described herein below in order for the topic based conversation retrieval system 100 to determine which topics or keywords should be stored, procured, etc., as metadata.

The metadata module 133 may save, store, generate, collect, create, or otherwise procure metadata related to, for example, times of day associated with the conversation. Various other types of metadata may be generated, saved, stored, collected, created or procured by the metadata module 133 such as context metadata, company metadata, user computing device metadata, and the like. The rules by which users request the topic based conversation retrieval system 100 to store and/or retrieve conversations may further be generated, saved, stored, collected, created or procured as metadata by the metadata module 133.

Embodiments of the metadata module 133 may include one or more components of hardware and/or software program code for indexing the metadata that was generated, saved, stored, collected, created or otherwise procured by the metadata module 133. The metadata module 133 may be configured to store, save or archive the metadata in an indexed manner such that the conversations, and metadata associated with the conversations, are retrievable.

The metadata that is generated, collected, created, stored or otherwise procured by the metadata module 133 and then indexed by the metadata module 133 may be utilized by the analytics module 134 and the topic based conversation retrieval system 100 to retrieve conversations, or portions of conversations, as requested by users. Further, the metadata module 133 may generate, save, store, collect, create, or otherwise procure metadata that includes information that tags and tracks communications based on user or person, conversation topic, keyword(s), and specific context information. This metadata collected may be the basis for the topic based conversation retrieval system 100, and provide the recording module 132 with the information necessary to determine which communications to record.

Embodiments of the analytics module 134 may include one or more components of hardware and/or software program code for analyzing, determining, evaluating, considering, and the like, the conversations recorded and/or received by the recording module 132. The analytics module 134 may be a topic awareness module and may be configured to determine one or more topics of discussion in a recorded conversation by analyzing the language recorded during the conversation. The analytics module 134 may be configured to determine the one or more topics of discussion in a recorded and/or received conversation by analyzing the metadata procured by the metadata module 133 related to the conversation.

Embodiments of the analytics module 134 may include the ability to track a centrality of a conversation being recorded and/or received. The centrality of the topic may be determined using, for example, a weighted average of various factors. This centrality of the topic of a conversation may be stored as metadata by the metadata module 133.

A first factor in determining the centrality of the topic may be a topic match. The topic match factor may be determined using taxonomy of word phrases and performing a synonym match. For example, in one embodiment, the topic match may be determined by the analytics module 134 to be a percentage match to the interested topic.

The second factor may be the variation of members attached to the topic. For example, the analytics module 134 may determine what percentage of the users are the same from the onset of a conversation. Further, the analytics module 134 may determine what percentage of the users in the conversation has changed over a predetermined time period (i.e. 24 hours).

A third factor may be the historical variation and decay rate of time for a given topic. For example, the topic based conversation retrieval system 100 and in particular the analytics module 134 may store information related to the rate at which specific topics typically decay over time. This decay rate may be topic specific, in one embodiment. Older conversations may be less relevant than newer conversations on a given topic because of the topic decay rate, in one embodiment and this factor may account for this.

A topic may also be tracked geographically, in one embodiment. Thus, if the same topic of conversation moves from a first geographic location to a second geographic location, the analytics module 134 may make this determination and store metadata associated with the movement of the conversation. Further, the analytics module 134 may determine that a conversation needs to be tracked and saved and is pertinent to a user request, despite a geographic change in the conversation.

Embodiments of the retrieving module 135 may include one or more components of hardware and/or software program code for retrieving conversations, or portions of conversations, at the request of one or more users. The retrieving module 135 may be configured to retrieve conversations related to one or more of a topic chosen to be retrieved, user information (i.e. user names, IP addresses, etc.), a time period of conversation, or the like. The retrieving module 135 may be configured to retrieve conversations based on the same rules that users requested the topic based conversation retrieval system 100 to store the conversation in the first place, in one embodiment.

The retrieving module 135 may be configured to receive a request by one or more user(s) to retrieve a portion of one or more conversations based on one or more rules. The retrieving module 135 may be configured to locate the requested portion of the one or more conversations using the metadata that has been indexed and stored by the metadata module 133. The retrieving module 135 may then be configured to send the portion of the one or more conversations to the user(s) making the request.

Figure 2:
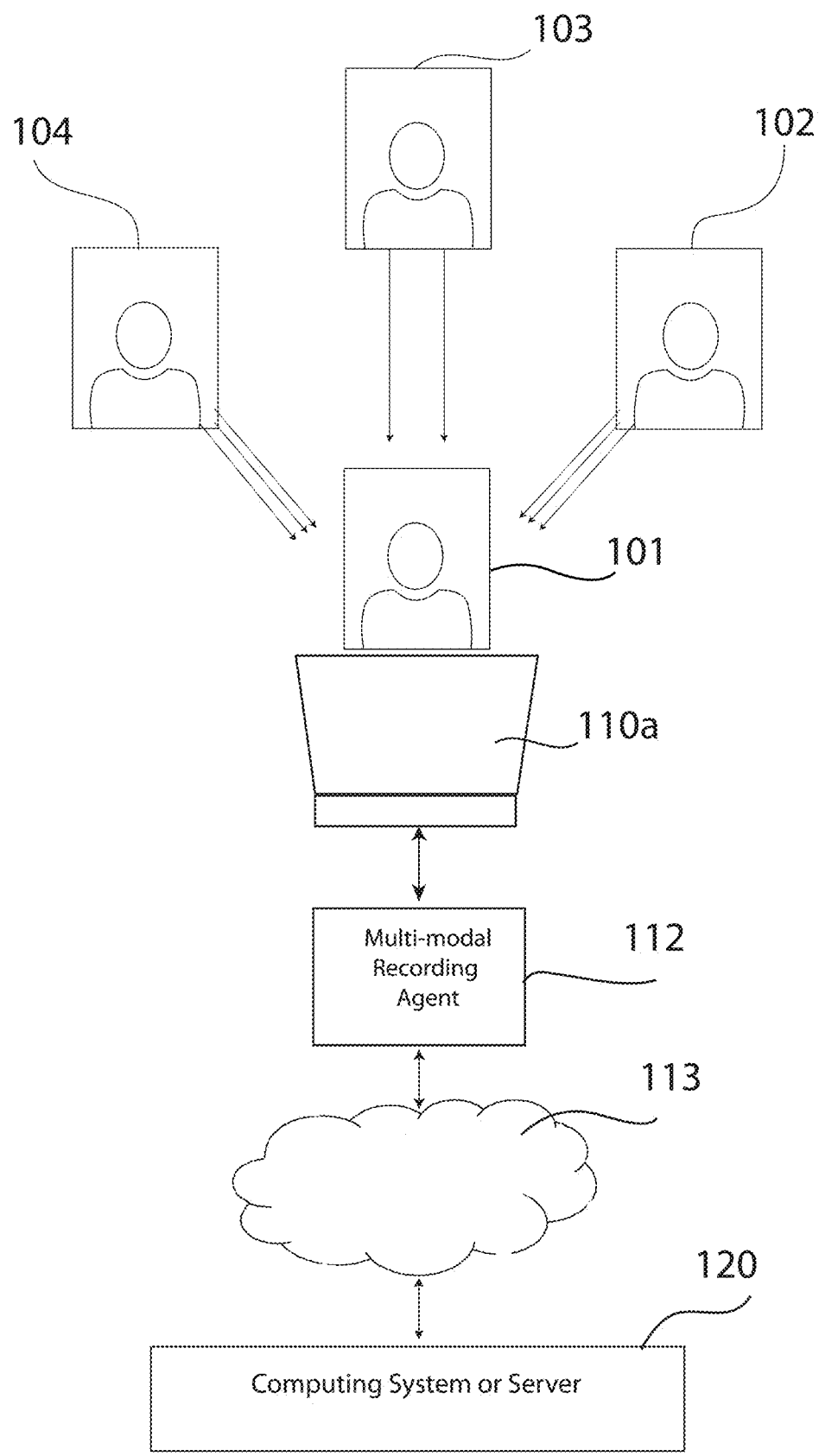
FIG. 2 depicts a block diagram of a topic based conversation retrieval system, in accordance with embodiments of the present invention.
Figure 3:
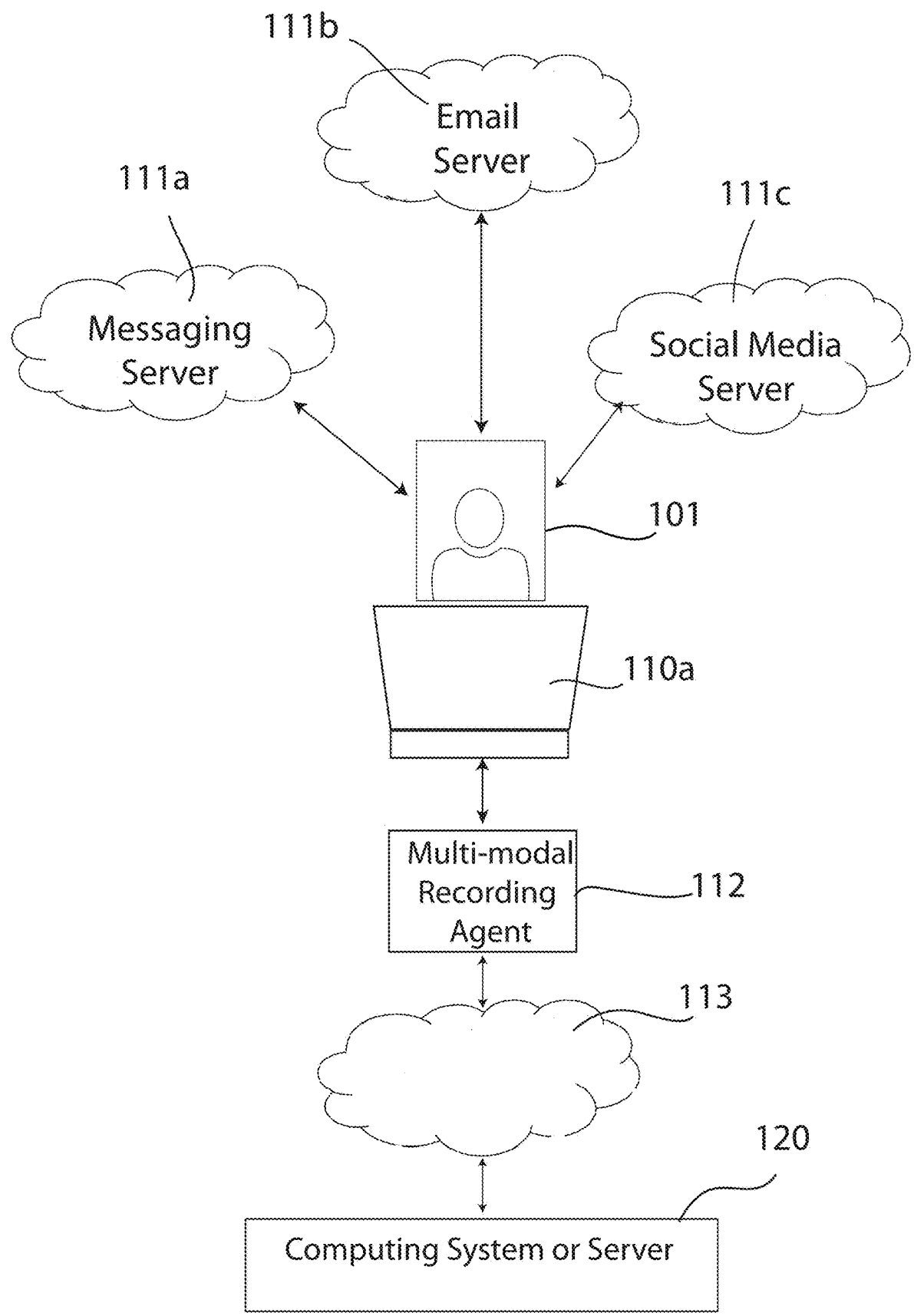
FIG. 3 depicts a block diagram of a topic based conversation retrieval system, in accordance with embodiments of the present invention.

Referring now to FIGS. 2 and 3, two block diagrams of the topic based conversation retrieval system 100 are depicted, in accordance with embodiments of the present invention. Specifically, FIG. 2, shows the topic based conversation retrieval system 100 connecting a plurality of users 101, 102, 103, 104. A first user 101 is shown having a user computing device 110a, but it should be understood that other users may each possess or be using one or more user computing devices as well. FIG. 3 shows that the topic based conversation retrieval system 100 connects the user 101 to a plurality of communication modes 111a, 111b, 111c. A first communication mode 111a is shown as a messaging server such as an IBM Sametime®, or Google® Chat server. A second communication mode 111b is shown as an email server, such as a Microsoft Outlook® server. A third communication mode 111c is shown as a social media server, such as a Facebook® server. Various other communication modes are contemplated. The topic based conversation retrieval system 100 may include any number of users, and each user may be connected to any number of communication modes. Thus, the user 101 that is recording conversation(s) as shown, may be connected to any number of users and/or communication mode servers.

The first user 101 may initiate recording through the multimodal recording agent 112. The multimodal recording agent 112 is shown as a component of the system 100 that is local to the first user 101. For example, the recording agent 112 may be an application running on the user computing device 110a of the first user 101. Alternatively, the recording agent 112 may be a separate specialized piece of hardware local or proximate to the user computing device 110a. The recording agent 112 may be connected, through a cloud 113 or other network, to a computing system 120 and/or server. Rather than being local to the user 101, the recording agent 112 may also be a component of or may be local to the computing system 120.

Once the user 101 expresses the desire to record a conversation, the recording agent 112 and/or the computing system 120, may prompt the user with questions related to which conversations the user wishes to record, including parameters and/or rules related to the recording. For example, the user 101 may be requested to provide information related to which communication modes 111a, 111b, 111c the user 101 wishes to record, which topics of conversation the recording agent 112 and/or computing system 120 should record, specific times that the recording should take place, user parameters related to specific other users 102, 103, 104 that the user 101 wishes to record conversations with, and the like. These rules or parameters may be stored and/or indexed as metadata by the recording agent 112 and/or the recording agent 112 may provide these rules to the computing system 120 or central server for storage.

Further, the recording agent 112 and/or the computing system 120 may be provided, by the user 101, with credential information related to various communication modes that the user 101 wishes to record conversations. For example, the user 101 may provide the recording agent 112 and/or computing system 120 with their login ID and/or password to the particular communication mode 111a, 111b, 111c to confirm that the actual user owning or otherwise associated or in charge of the user account is making the request for recording.

Once it is determined which conversations to record, the recording agent 112 and/or computing system 120 may begin conducting conversations between the requesting user 101 and with the other users 102, 103, 104 across various communication modes. The recording agent 112 may be configured to receive and/or record those conversations, and/or portions of those conversations, and/or metadata related to those conversations. In some embodiments, once recording begins, the recording may continue by the recording agent 112 and/or computing system 120 even after the original requesting user 101 has left the conversation. In some embodiments, the computing system 120 may prompt the other users 102, 103, 104 with a permission request to record their conversations as well so that if the original requesting user leaves, recording may continue. In other embodiments, permission may be not required to maintain recording a conversation if the original requester is unavailable, leaves a conversation, or the like.

The information recorded by the recording agent 112 and/or the computing system 120 may enable the system 100 to retrieve requested portions of the conversation once the user requests retrieval. Once the user 101 makes a request to retrieve conversation(s), the computing system 120 and/or recording agent 112 may request information from the user 101 related to which conversations, or portions thereof, the user wishes to retrieve. For example, the user 101 may provide information related to which communication modes the user wishes to retrieve, which topics of conversation the recording agent 112 should be retrieved, specific times of conversations that should be retrieved, user parameters related to the specific other users 102, 103, 104 that the user 101 wishes to retrieve conversations between, or combinations thereof. In the event that the user 101 has already been specific in the pre-recording stage in providing the recording agent 112 with the specific parameters or rules related to the specific portions of conversations the user 101 wishes to record, the user may simply ask for the already defined portions of conversation to be retrieved by the computing system 120 and/or recording agent 112 and not have to specifically redefine what the user 101 wishes to have retrieved.

In one embodiment, the entirety of the conversation remains only stored on the server of the communication modes 111a, 111b, 111c . . . 111n. In this embodiment, the computing system 120 may only store metadata related to the recording by the recording agent 112, but not the entirety of the conversation itself. Once the request for retrieval has been made, the computing system 120 may use the stored metadata to request the portions of conversations stored at the individual communication modes 111a, 111b, 111c . . . 111n. In other embodiments, the computing system 120 may store both the entirety of the conversation and metadata associated therewith. Whatever the embodiment, the computing system 120 may be utilized to retrieve relevant portions of the conversation as requested by the user 101 pertaining to the parameters or rules of the request.

Figure 4:
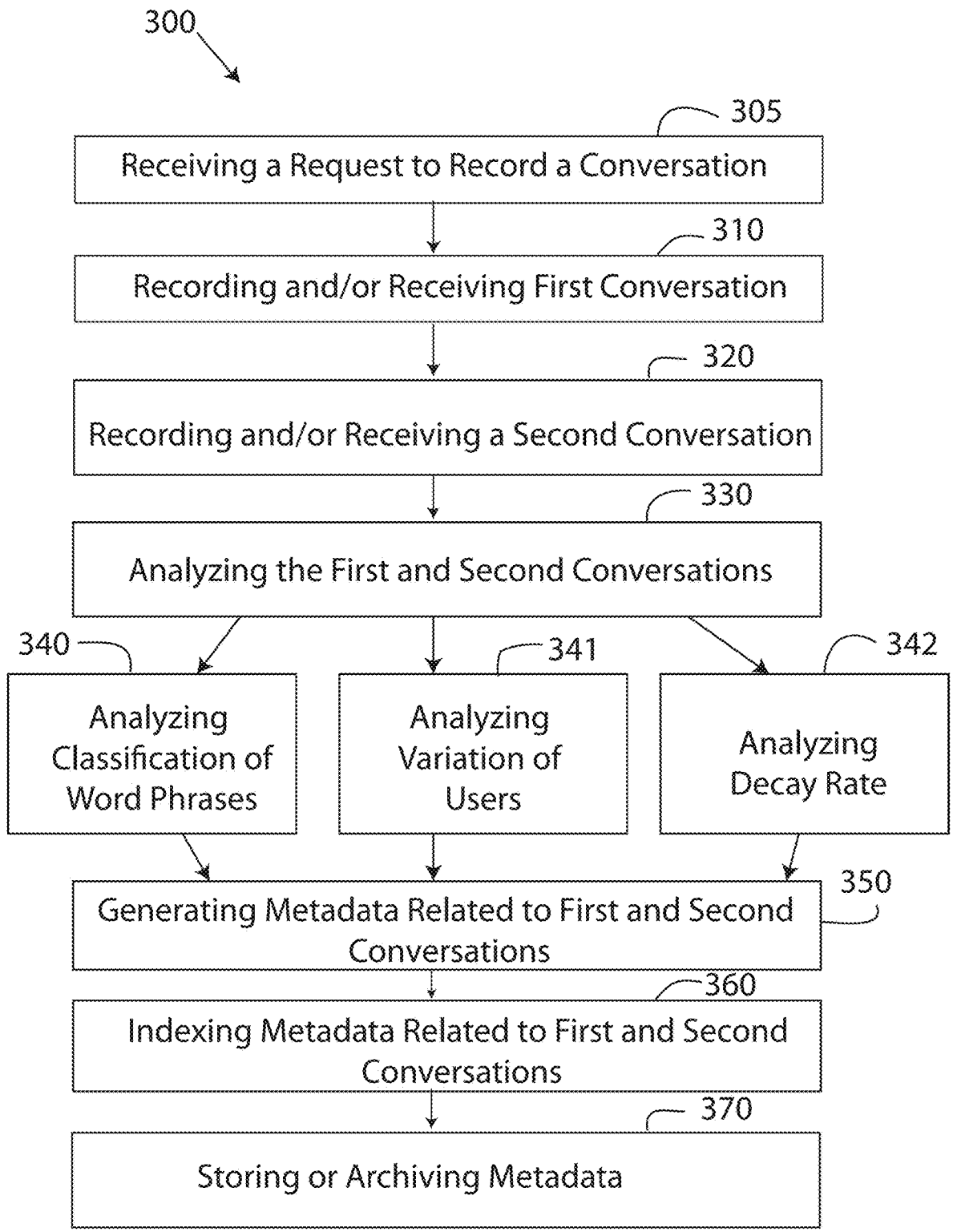
FIG. 4 depicts a flow chart of a method for topic based conversation recording and/or receiving, in accordance with embodiments of the present invention.

Referring now to FIG. 4, a flow chart of a method for topic based conversation recording and/or receiving 300 is depicted, in accordance with embodiments of the present invention. The method 300 may include a first step 305 of receiving, by a receiving and/or recording module of a computing system (such as the receiving and/or recording module 132 of the computing system 120 or a recording agent such as the recording agent 112) a request made by a user (such as the user 101) to record one or more conversations. The method may include a second step 310 of recording and/or receiving a first conversation with a first plurality of users and a third step 320 of recording and/or receiving a second conversation with a second plurality of users, pursuant to the request, by for example the receiving and/or recording module or the recording agent.

The method may then include a step 330 of analyzing, by for example the computing system or the recording agent (such as the analytics module 134 of the computing system 120) the first and second conversations. The analyzing may include one or more sub-steps 340, 341 and 342 which may relate to determining a topic of discussion of the first and the second conversation, along with determining a centrality of the topic of discussion during the course of the conversation over time. Specifically, the method 300 may include a step 341 of determining a classification of word phrases used in the first conversation and the second conversation. The method 300 may include a step 342 of determining variations in users within the first plurality of users and the second plurality of users. The method may include a step 343 of determining or analyzing a decay rate for the one or more topics of discussion, as described herein above.

The method 300 may then include a step of generating metadata by the computing system (such as by the metadata module 133 of the computing system 120) related to user identification of the first and second plurality of users, topics, time or the like. The method 300 may include a step 360 of indexing the metadata by the computer system (such as by the metadata module 133 of the computing system 120) by, for example, one or more rules related to the user identification of the first and second plurality of users, topics, time or the like. The method 300 may include a step 370 of storing, archiving, or otherwise procuring the metadata at the computing system (such as at the data repository 125 of the computing system 120).

Figure 5:
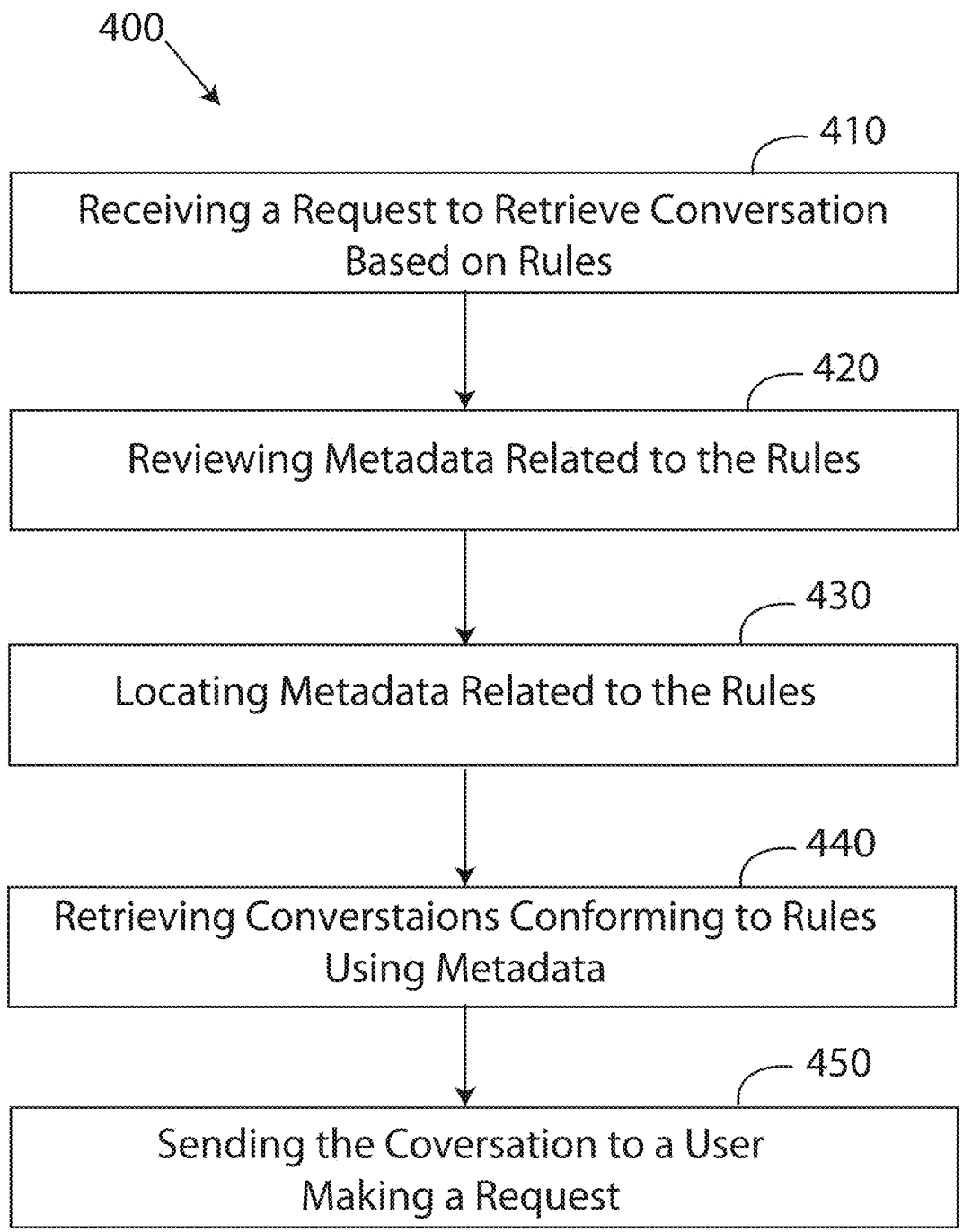
FIG. 5 depicts a flow chart of a method for topic based conversation retrieval, in accordance with embodiments of the present invention.

Referring now to FIG. 5, a flow chart of a method for topic based conversation retrieval 400 is depicted, in accordance with embodiments of the present invention. The method 400 may include a first step 410 of receiving, by a receiving and/or recording module of a computing system (such as the receiving and/or recording module 132 of the computing system 120 or a recording agent such as the recording agent 112), a request by a user (such as the user 101) to retrieve one or more conversations, or portions thereof, based on one or more rules or parameters. The method 400 may include a step 420 of reviewing, by the computing system (such as the metadata module 133 of the computing system 120) metadata related to the one or more rules or parameters. The method 400 may include a step 430 of locating, by the computing system (such as the analytics module 134 or retrieving module 135 of the computing system 120) the one or more conversations, or portions thereof, based on the one or more rules or parameters. The method 400 may include a step of retrieving, by the computing system (such as the retrieving module 135 of the computing system 120) the one or more conversations, or portions thereof, based on the one or more rules or parameters. The method 400 may include a step of sending, by the computing system (such as the retrieving module 135 of the computing system 120) the one or more conversations, or portions thereof, to the user making the request or a user computing device (such as the user computing device 110*a*) of the user.

Figure 6:
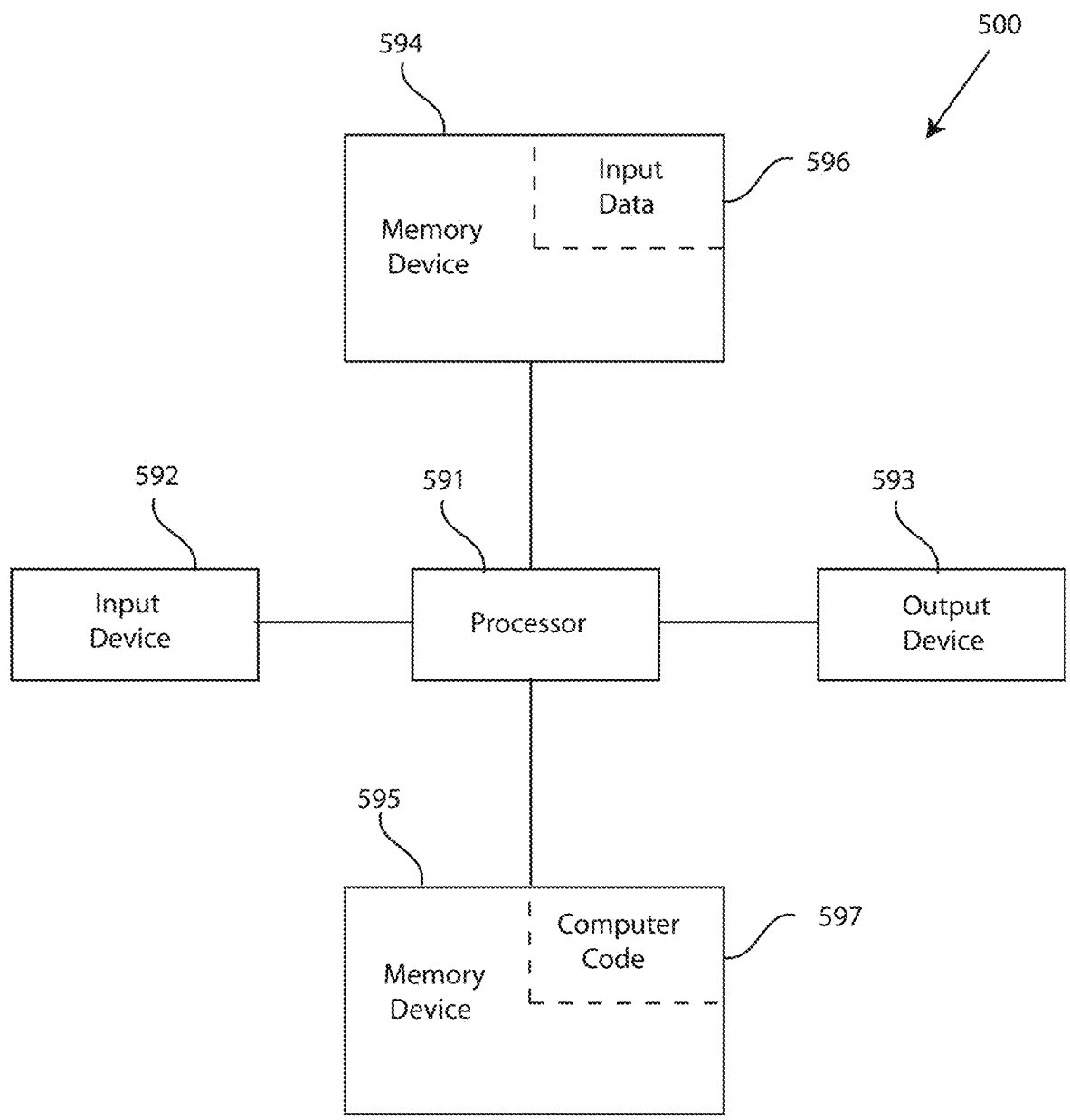
FIG. 6 depicts a block diagram of a computer system for the topic based collaborative recording and retrieving system of FIGS. 1-3, capable of implementing methods for topic based conversation retrieval of FIGS. 4-5, in accordance with embodiments of the present invention.

FIG. 6 depicts a block diagram of a computer system for the topic based conversation retrieval system of FIG. 1, capable of implementing methods for topic based conversation recording and retrieval of FIGS. 4-5, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for topic based conversation retrieval by recording and/or retrieving conversations in the manner prescribed by the embodiments of FIGS. 2-5 using the topic based conversation retrieval system 100 of FIG. 1, wherein the instructions of the computer code 597 may be executed by processor 591 via memory device 595. The computer code 597 may include software or program instructions that may implement one or more algorithms for implementing the methods for topic based conversation retrieval, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to identification validation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to perform the method for topic based conversation retrieval by connecting users. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for topic based conversation retrieval by connecting users. Thus, the present invention discloses a process for supporting, deploying and/or integrating computer infrastructure, integrating, hosting, maintaining, and deploying computer-readable code into the computer system 500, wherein the code in combination with the computer system 700 is capable of performing a method for topic based conversation retrieval.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
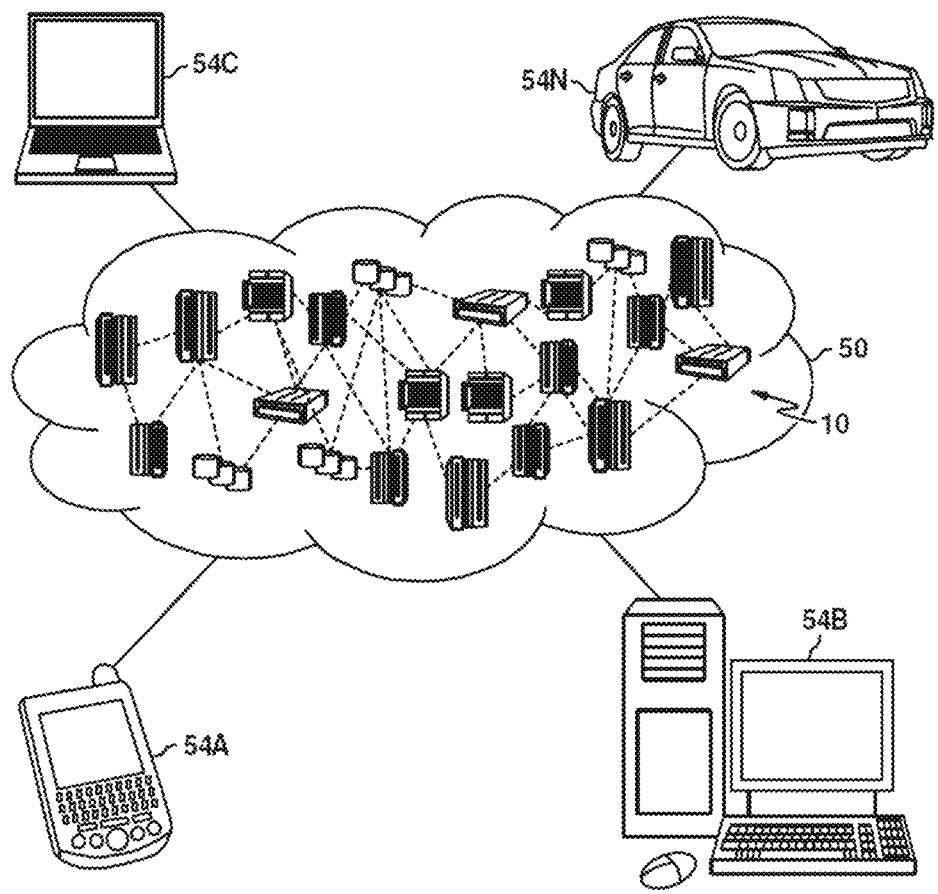
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers or users, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
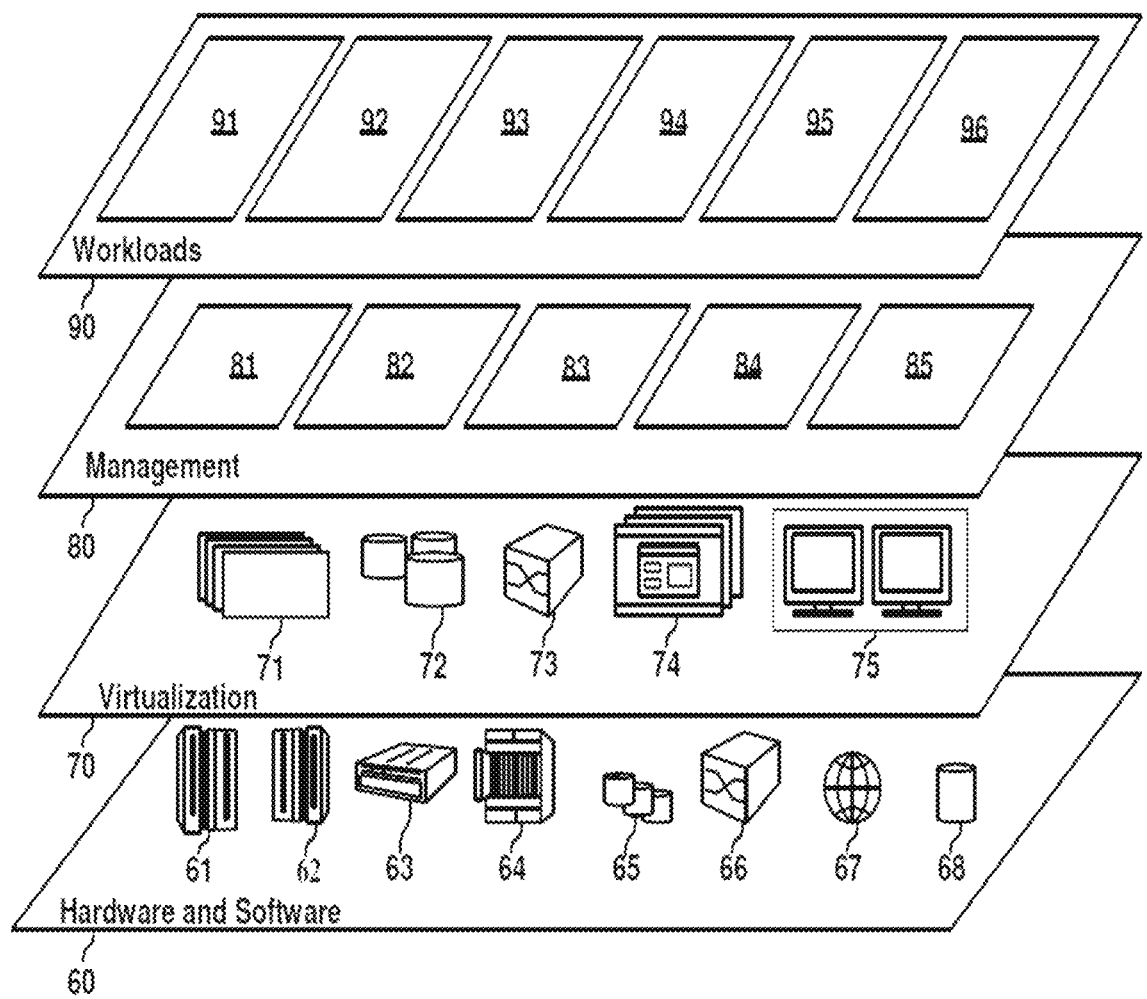
FIG. 8 depicts abstraction model layers, in accordance with embodiments of the present invention.

Referring now to FIG. 8, a set of functional abstraction layers provided by cloud computing environment 50 (see FIG. 7) are shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and topic based conversation retrieval 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for topic-based conversation retrieval, the method comprising:
    receiving, by one or more processors of a computer system, a first conversation between a first plurality of users, the first conversation being conducted on a first communication mode;
    receiving, by the one or more processors, a second conversation between the first plurality of users or a second plurality of users, the second conversation being conducted on a second communication mode different than the first communication mode, wherein the first communication mode and the second communication mode are each selected from the group consisting of an email service, a wireless texting service, an online chat messaging service, a social media service, and a voice service, and wherein the selection of the first communication mode is different than the selection of the second communication mode;
    analyzing, by the one or more processors, the first conversation and the second conversation;
    determining, by the one or more processors, one or more topics of discussion in the first conversation and the second conversation;
    retrieving, by the one or more processors, a portion of each of the first conversation and the second conversation, wherein the portion is related to a topic chosen to be retrieved; and
    recording, by a multimodal recording agent of the one or more processors of the computer system, the first conversation between the first plurality of users and the second conversation between the second plurality of users, wherein the multimodal recording agent is located on one or more devices used by the first plurality of users and the second plurality of users.

2. The method of claim 1, wherein the analyzing the first conversation and the second conversation further includes:
    generating, by the one or more processors, metadata related to user identification of the first and second plurality of users and metadata related to the one or more topics; and
    indexing, by the one or more processors, the metadata by one or more rules related to user identification of the first and second plurality of users and metadata related to the one or more topics.

3. The method of claim 1, wherein the determining the one or more topics of discussion in the first conversation and the second conversation includes tracking a centrality of a topic over time.

4. The method of claim 3, wherein tracking the centrality includes determining:
    a classification of word phrases used in the first conversation and the second conversation;
    variations in users within the first plurality of users and the second plurality of users; and
    a decay rate for the one or more topics of discussion.

5. The method of claim 2, wherein the multimodal recording agent performs the steps of:
    generating the metadata related to the user identification of the first and second plurality of users and metadata related to the one or more topics; and
    indexing the metadata by one or more rules related to user identification of the first and second plurality of users and metadata related to the one or more topics.

6. The method of claim 5, further comprising sending, by the recording agent, the indexed metadata to a multimodal communication server of the one or more computer processors, wherein the retrieving the portion of each of the first conversation and the second conversation related to the topic chosen to be retrieved further includes:
    receiving, by the multimodal communication server, a request by a user to the multimodal communication server to retrieve the portion of each of the first conversation and the second conversation based on the one or more rules; and
    locating, by the multimodal communication server, the portion of each of the first conversation and the second conversation based on the one or more rules; and sending, by the multimodal communication server, the portion of each of the first conversation and the second conversation to the user making the request.

7. A computer system, comprising:
a processor;
a memory device coupled to the processor; and
a computer readable storage device coupled to the processor, wherein the storage device contains program code executable by the processor via the memory device to implement a method for topic based conversation retrieving, the method comprising:
receiving, by one or more processors of a computer system, a first conversation between a first plurality of users, the first conversation being conducted on a first communication mode;
receiving, by the one or more processors, a second conversation between the first plurality of users or a second plurality of users, the second conversation being conducted on a second communication mode different than the first communication mode, wherein the first communication mode and the second communication mode are each selected from the group consisting of an email service, a wireless texting service, an online chat messaging service, a social media service, and a voice service, and wherein the selection of the first communication mode is different than the selection of the second communication mode;
analyzing, by the one or more processors, the first conversation and the second conversation;
determining, by the one or more processors, one or more topics of discussion in the first conversation and the second conversation;
retrieving, by the one or more processors, a portion of each of the first conversation and the second conversation, wherein the portion is related to a topic chosen to be retrieved; and
recording, by a multimodal recording agent of the one or more processors of the computer system, the first conversation between the first plurality of users and the second conversation between the second plurality of users, wherein the multimodal recording agent is located on one or more devices used by the first plurality of users and the second plurality of users.

8. The computer system of claim 7, wherein the analyzing the first conversation and the second conversation further includes:
generating, by the one or more processors, metadata related to user identification of the first and second plurality of users and metadata related to the one or more topics; and
indexing, by the one or more processors, the metadata by one or more rules related to user identification of the first and second plurality of users and metadata related to the one or more topics.

9. The computer system of claim 7, wherein the determining the one or more topics of discussion in the first conversation and the second conversation includes tracking a centrality of a topic over time.

10. The computer system of claim 9, wherein tracking the centrality includes determining:
a classification of word phrases used in the first conversation and the second conversation;
variations in users within the first plurality of users and the second plurality of users; and
a decay rate for the one or more topics of discussion.

11. The computer system of claim 8, wherein the multimodal recording agent performs the steps of:
generating the metadata related to the user identification of the first and second plurality of users and metadata related to the one or more topics; and
indexing the metadata by one or more rules related to user identification of the first and second plurality of users and metadata related to the one or more topics.

12. The computer system of claim 11, the method further comprising sending, by the recording agent, the indexed metadata to a multimodal communication server of the one or more computer processors, wherein the retrieving the portion of each of the first conversation and the second conversation related to the topic chosen to be retrieved further includes:
receiving, by the multimodal communication server, a request by a user to the multimodal communication server to retrieve the portion of each of the first conversation and the second conversation based on the one or more rules; and
locating, by the multimodal communication server, the portion of each of the first conversation and the second conversation based on the one or more rules; and
sending, by the multimodal communication server, the portion of each of the first conversation and the second conversation to the user making the request.

13. A computer program product, comprising a computer readable non-transitory hardware storage device storing a computer readable program code, the computer readable program code comprising an algorithm that when executed by a processor of a computing system implements a method for topic based conversation retrieving, the method comprising:
receiving, by one or more processors of a computer system, a first conversation between a first plurality of users, the first conversation being conducted on a first communication mode;
receiving, by the one or more processors, a second conversation between the first plurality of users or a second plurality of users, the second conversation being conducted on a second communication mode different than the first communication mode, wherein the first communication mode and the second communication mode are each selected from the group consisting of an email service, a wireless texting service, an online chat messaging service, a social media service, and a voice service, and wherein the selection of the first communication mode is different than the selection of the second communication mode;
analyzing, by the one or more processors, the first conversation and the second conversation;
determining, by the one or more processors, one or more topics of discussion in the first conversation and the second conversation;
retrieving, by the one or more processors, a portion of each of the first conversation and the second conversation, wherein the portion is related to a topic chosen to be retrieved; and
recording, by a multimodal recording agent of the one or more processors of the computer system, the first conversation between the first plurality of users and the second conversation between the second plurality of users, wherein the multimodal recording agent is located on one or more devices used by the first plurality of users and the second plurality of users.

14. The computer program product of claim 13, wherein the analyzing the first conversation and the second conversation further includes:
- generating, by the one or more processors, metadata related to user identification of the first and second plurality of users and metadata related to the one or more topics; and
- indexing, by the one or more processors, the metadata by one or more rules related to user identification of the first and second plurality of users and metadata related to the one or more topics.

15. The computer program product of claim 13, wherein the determining the one or more topics of discussion in the first conversation and the second conversation includes tracking a centrality of a topic over time, wherein tracking the centrality includes determining:
- a classification of word phrases used in the first conversation and the second conversation;
- variations in users within the first plurality of users and the second plurality of users; and
- a decay rate for the one or more topics of discussion.

16. The computer program product of claim 14, wherein the multimodal recording agent performs the steps of:
- generating the metadata related to the user identification of the first and second plurality of users and metadata related to the one or more topics; and
- indexing the metadata by one or more rules related to user identification of the first and second plurality of users and metadata related to the one or more topics.

17. The computer program product of claim 16, the method further comprising sending, by the recording agent, the indexed metadata to a multimodal communication server of the one or more computer processors, wherein the retrieving the portion of each of the first conversation and the second conversation related to the topic chosen to be retrieved further includes:
- receiving, by the multimodal communication server, a request by a user to the multimodal communication server to retrieve the portion of each of the first conversation and the second conversation based on the one or more rules; and
- locating, by the multimodal communication server, the portion of each of the first conversation and the second conversation based on the one or more rules; and
- sending, by the multimodal communication server, the portion of each of the first conversation and the second conversation to the user making the request.

* * * * *